United States Patent
Balasubramanian et al.

(10) Patent No.: US 11,836,202 B2
(45) Date of Patent: Dec. 5, 2023

(54) METHODS AND SYSTEMS FOR DYNAMIC SEARCH LISTING RANKING OF SOFTWARE COMPONENTS

(71) Applicant: Open Weaver Inc., Miami, FL (US)

(72) Inventors: Ashok Balasubramanian, Chennai (IN); Karthikeyan Krishnaswamy Raja, Chennai (IN); Arul Reagan S, Chengalpattu District (IN); John Hansel, Chennai (IN)

(73) Assignee: Open Weaver Inc., Miami, FL (US)

(*) Notice: Subject to any disclaimer, the term of this patent is extended or adjusted under 35 U.S.C. 154(b) by 0 days.

(21) Appl. No.: 17/677,771

(22) Filed: Feb. 22, 2022

(65) Prior Publication Data
US 2022/0269743 A1    Aug. 25, 2022

Related U.S. Application Data

(60) Provisional application No. 63/153,210, filed on Feb. 24, 2021.

(51) Int. Cl.
*G06F 16/9535* (2019.01)
*G06F 16/9536* (2019.01)
(Continued)

(52) U.S. Cl.
CPC ...... *G06F 16/9535* (2019.01); *G06F 16/9536* (2019.01); *G06F 16/9538* (2019.01);
(Continued)

(58) Field of Classification Search
CPC .. G06F 21/577; G06F 21/565; G06F 16/9538; G06F 16/9535; G06F 18/214; G06F 2221/033; G06N 20/00
See application file for complete search history.

(56) References Cited

U.S. PATENT DOCUMENTS

| | | |
|---|---|---|
| 5,953,526 A | 9/1999 | Day et al. |
| 7,322,024 B2 | 1/2008 | Carlson et al. |

(Continued)

FOREIGN PATENT DOCUMENTS

| | | |
|---|---|---|
| CN | 108052442 A | 5/2018 |
| KR | 10-2020-0062917 | 6/2020 |

(Continued)

OTHER PUBLICATIONS

Lampropoulos et al, "REACT—A Process for Improving Open-Source Software Reuse", IEEE, pp. 251-254 (Year: 2018).

(Continued)

*Primary Examiner* — Etienne P Leroux
(74) *Attorney, Agent, or Firm* — Foley & Lardner LLP

(57) ABSTRACT

Systems and methods for automatically generating search list rankings of software components are provided. An exemplary method includes generating a list of software components in response to a request, generating ranking parameters, determining first weight values correlating with each of the ranking parameters, generating an index correlating each of the software components with each of the ranking parameters, parsing web data to populate the index, determining, via the ranking parameters, scores for each of the software components, storing the scores on the index, applying the first weight values to the scores on the index, and generating, for each of the software components, a combined score, wherein the combined score is a combination of each of the scores that are associated with each of the software components.

17 Claims, 8 Drawing Sheets

(51) Int. Cl.
  *G06F 16/9538* (2019.01)
  *G06F 21/56* (2013.01)
  *G06N 20/00* (2019.01)
  *G06K 9/62* (2022.01)
  *G06F 18/214* (2023.01)

(52) U.S. Cl.
  CPC .......... *G06F 18/214* (2023.01); *G06F 21/565* (2013.01); *G06N 20/00* (2019.01)

(56) References Cited

U.S. PATENT DOCUMENTS

| | | | |
|---|---|---|---|
| 7,703,070 B2 | 4/2010 | Bisceglia | |
| 7,774,288 B2 | 8/2010 | Acharya et al. | |
| 7,958,493 B2 | 6/2011 | Lindsey et al. | |
| 8,010,539 B2 | 8/2011 | Blair-Goldensohn et al. | |
| 8,051,332 B2 | 11/2011 | Zakonov et al. | |
| 8,112,738 B2 | 2/2012 | Pohl et al. | |
| 8,112,744 B2 | 2/2012 | Geisinger | |
| 8,219,557 B2 | 7/2012 | Grefenstette et al. | |
| 8,296,311 B2 | 10/2012 | Rapp et al. | |
| 8,412,813 B2 | 4/2013 | Carlson et al. | |
| 8,417,713 B1 | 4/2013 | Blair-Goldensohn et al. | |
| 8,452,742 B2 | 5/2013 | Hashimoto et al. | |
| 8,463,595 B1 | 6/2013 | Rehling et al. | |
| 8,498,974 B1 | 7/2013 | Kim et al. | |
| 8,627,270 B2 | 1/2014 | Fox et al. | |
| 8,677,320 B2 | 3/2014 | Wilson et al. | |
| 8,688,676 B2 | 4/2014 | Rush et al. | |
| 8,838,606 B1 | 9/2014 | Cormack et al. | |
| 8,838,633 B2 | 9/2014 | Dhillon et al. | |
| 8,935,192 B1 | 1/2015 | Ventilla et al. | |
| 8,943,039 B1 | 1/2015 | Grieselhuber et al. | |
| 9,015,730 B1 | 4/2015 | Allen et al. | |
| 9,043,753 B2 | 5/2015 | Fox et al. | |
| 9,047,283 B1 | 6/2015 | Zhang et al. | |
| 9,135,665 B2 | 9/2015 | England et al. | |
| 9,176,729 B2 | 11/2015 | Mockus et al. | |
| 9,201,931 B2 | 12/2015 | Lightner et al. | |
| 9,268,805 B2 | 2/2016 | Crossley et al. | |
| 9,330,174 B1 | 5/2016 | Zhang | |
| 9,361,294 B2 | 6/2016 | Smith | |
| 9,390,268 B1 | 7/2016 | Martini et al. | |
| 9,471,559 B2 | 10/2016 | Castelli et al. | |
| 9,589,250 B2 | 3/2017 | Palanisamy et al. | |
| 9,626,164 B1 | 4/2017 | Fuchs | |
| 9,672,554 B2 | 6/2017 | Dumon et al. | |
| 9,977,656 B1 | 5/2018 | Mannopantar et al. | |
| 10,484,429 B1* | 11/2019 | Fawcett ................. H04L 63/20 | |
| 10,761,839 B1 | 9/2020 | Migoya et al. | |
| 10,922,740 B2* | 2/2021 | Gupta ................. G06Q 30/0633 | |
| 11,474,817 B2 | 10/2022 | Sousa et al. | |
| 2001/0054054 A1 | 12/2001 | Olson | |
| 2002/0059204 A1 | 5/2002 | Harris | |
| 2002/0150966 A1 | 10/2002 | Muraca | |
| 2002/0194578 A1 | 12/2002 | Irie et al. | |
| 2004/0243568 A1 | 12/2004 | Wang et al. | |
| 2006/0090077 A1* | 4/2006 | Little ..................... G06F 21/10 713/184 |
| 2006/0200741 A1 | 9/2006 | DeMesa et al. | |
| 2006/0265232 A1 | 11/2006 | Katariya et al. | |
| 2007/0050343 A1 | 3/2007 | Siddarampappa et al. | |
| 2007/0185860 A1 | 8/2007 | Lissack | |
| 2007/0234291 A1 | 10/2007 | Ronen et al. | |
| 2007/0299825 A1 | 12/2007 | Rush et al. | |
| 2009/0043612 A1 | 2/2009 | Szela et al. | |
| 2009/0319342 A1 | 12/2009 | Shilman et al. | |
| 2010/0106705 A1 | 4/2010 | Rush et al. | |
| 2010/0121857 A1 | 5/2010 | Elmore et al. | |
| 2010/0174670 A1 | 7/2010 | Malik et al. | |
| 2010/0205198 A1 | 8/2010 | Mishne et al. | |
| 2010/0205663 A1 | 8/2010 | Ward et al. | |
| 2010/0262454 A1 | 10/2010 | Sommer et al. | |
| 2011/0231817 A1 | 9/2011 | Hadar et al. | |
| 2012/0143879 A1 | 6/2012 | Stoitsev | |
| 2012/0259882 A1 | 10/2012 | Thakur et al. | |
| 2012/0278064 A1 | 11/2012 | Leary et al. | |
| 2013/0103662 A1 | 4/2013 | Epstein | |
| 2013/0117254 A1* | 5/2013 | Manuel-Devadoss ..................... G06F 16/951 707/709 |
| 2014/0040238 A1 | 2/2014 | Scott et al. | |
| 2014/0075414 A1 | 3/2014 | Fox et al. | |
| 2014/0163959 A1 | 6/2014 | Hebert et al. | |
| 2014/0188746 A1* | 7/2014 | Li ......................... G06Q 50/205 705/326 |
| 2014/0297476 A1* | 10/2014 | Wang ..................... G06F 16/335 705/26.62 |
| 2014/0337355 A1 | 11/2014 | Heinze | |
| 2015/0127567 A1 | 5/2015 | Menon et al. | |
| 2015/0220608 A1 | 8/2015 | Crestani Campos et al. | |
| 2015/0331866 A1 | 11/2015 | Shen et al. | |
| 2016/0253688 A1 | 9/2016 | Nielsen et al. | |
| 2016/0350105 A1 | 12/2016 | Kumar et al. | |
| 2016/0378618 A1 | 12/2016 | Cmielowski et al. | |
| 2017/0034023 A1 | 2/2017 | Nickolov et al. | |
| 2017/0220633 A1 | 8/2017 | Porath et al. | |
| 2017/0286541 A1 | 10/2017 | Mosley et al. | |
| 2018/0046609 A1 | 2/2018 | Agarwal et al. | |
| 2018/0067836 A1 | 3/2018 | Apkon et al. | |
| 2018/0114000 A1 | 4/2018 | Taylor | |
| 2018/0329883 A1 | 11/2018 | Leidner et al. | |
| 2019/0278933 A1 | 9/2019 | Bendory et al. | |
| 2019/0311044 A1* | 10/2019 | Xu ......................... G06N 20/20 |
| 2019/0324981 A1 | 10/2019 | Counts et al. | |
| 2020/0110839 A1 | 4/2020 | Wang et al. | |
| 2020/0125482 A1 | 4/2020 | Smith et al. | |
| 2020/0133830 A1* | 4/2020 | Sharma ............... G06F 11/3676 |
| 2020/0293354 A1 | 9/2020 | Song et al. | |
| 2020/0348929 A1 | 11/2020 | Sousa et al. | |
| 2021/0141863 A1 | 5/2021 | Wu et al. | |
| 2021/0149668 A1 | 5/2021 | Gupta et al. | |
| 2021/0349801 A1* | 11/2021 | Rafey ................. G06F 11/3495 |
| 2021/0357210 A1 | 11/2021 | Clement et al. | |
| 2022/0012297 A1* | 1/2022 | Basu ..................... G06F 16/953 |

FOREIGN PATENT DOCUMENTS

| | | |
|---|---|---|
| WO | WO-2007/013418 A1 | 2/2007 |
| WO | WO-2020/086773 A1 | 4/2020 |

OTHER PUBLICATIONS

Leclair et al., "A Neural Model for Generating Natural Language Summaries of Program Subroutines," Collin McMillan, Dept. of Computer Science and Engineering, University of Notre Dame Notre Dame, IN, USA, Feb. 5, 2019.

Schweik et al., Proceedings of the OSS 2011 Doctoral Consortium, Oct. 5, 2011, Salvador, Brazil, pp. 1-100, Http:/Avorks.bepress.com/charles_schweik/20 (Year: 2011).

Stanciulescu et al., "Forked and Integrated Variants in an Open-Source Firmware Project", IEEE, pp. 151-160 (Year: 2015).

Zaimi et al., ":An Empirical Study on the Reuse of Third-Party Libraries in Open-Source Software Development", ACM, pp. 1-8 (Year: 2015).

Iderli Souza, An Analysis of Automated Code Inspection Tools for PHP Available on Github Marketplace, Sep. 2021, pp. 10-17 (Year: 2021).

Khatri et al., "Validation of Patient Headache Care Education System (PHCES) Using a Software Reuse Reference Model", Journal of System Architecture, pp. 157-162 (Year: 2001).

Lotter et al., "Code Reuse in Stack Overflow and Popular Open Source Java Projects", IEEE, pp. 141-150 (Year: 2018).

Rothenberger et al., "Strategies for Software Reuse: A Principal Component Analysis of Reuse Practices", IEEE, pp. 825-837 (Year:2003).

Tung et al., "A Framework of Code Reuse in Open Source Software", ACM, pp. 1-6 (Year: 2014).

* cited by examiner

METHODS AND SYSTEMS FOR DYNAMIC SEARCH LISTING RANKING OF SOFTWARE COMPONENTS

CROSS-REFERENCE TO RELATED PATENT APPLICATION

This application claims the benefit of and priority to U.S. Provisional Patent Application No. 63/153,210 filed Feb. 24, 2021, the entire disclosure of which is incorporated by reference herein.

TECHNICAL FIELD

The present disclosure relates generally to methods and systems for sorting software components based on their ecosystem activity and can be used in conjunction with a search engine for software components.

BACKGROUND

As the availability of open-source technologies, cloud-based public code repositories, and cloud-based applications increases exponentially, there is a need for software developers to efficiently find such software components for use in their software development. Today there are more than 30 million public code repositories and 100,000 public application-programming interfaces (APIs). Moreover, there are over 100 million articles that provide knowledge and review of such software components.

Even with a dedicated software search engine that produces a search similarity score, in order to make an informed choice on whether to use a software component, the developer may need to know information on how other developers are using the software component, whether the software component has positive reviews, whether the software component is supported, whether the software component is free of bugs, whether the software component have recent releases, and whether the software component has any security vulnerabilities.

SUMMARY

There is provided, in accordance with an embodiment of the present invention a method of dynamic search listing ranking of software components. According to the method a list of software components is determined based on a user input received from a search system. Thereafter, the weights for the different ranking parameters based on which the ranking of the list of the software components is to be determined is computed. The ranking parameters include a popularity score of a software component, a release score of the software component, a fork and download score of the software component, a release score of the software component, a defect and quality score of a software component, a support score of a software component, a security and vulnerability score of a software component. Further, the information about the ranking parameters of the software component is retrieved by crawling the various sources on the interne. Based on the retrieved information, a popularity score of the software components is computed that indicates how popular a software component is. Similarly, a release score of the software components is computed based on the retrieved information, wherein the release score indicates about frequency of release of updates of the software component. Also, a fork and download score of the software components is commuted based on the retrieved information, wherein the fork and download score indicates about user rating of the software component. Furthermore, a defect and quality score of the software component is computed based on the retrieved information. The retrieved information is also used to compute a support score of the software components and a security and vulnerability score of the software components. The support score indicates about quality of provided support for a software component and the security and vulnerability score indicates about security of a software component. The software components list is sorted based on the scores of the ranking parameters and the weight assigned to the ranking parameters. Finally, the list of the ranked software components is transmitted to the search system.

In some embodiments, the method may comprise processing the list of software components from the search or similar listing system and requesting for parameters for which ranking information is requested and based on the parameters and calling all or some of the services from one of repository stars rating service, releases rating service, forks rating service, defect rating service, Q&A rating service, vulnerability rating service and collating the ranking score from these services and returning a pair value along with the respective parameter. In further embodiments, the method comprises comprising leveraging machine learning technologies to compute the weights or priority of the different ranking parameters and computing weights based on a ranking request of the user, the software component, and the user preferences using similar software components. In further embodiments, the method comprises leveraging machine learning technologies to calculate the popularity of the software components and processing ranking of the software components across different provider metrics as well as third party software component rating services and normalizing the ratings across various sources for the same or multiple components to determine popularity of the software component.

In yet further embodiments, the release score is computed based on the release frequency of the software components and a frequency of recent updates of the software components.

In one embodiment, the method comprises computing a usage rating for the software components based on number of user downloads and number of forks in a software code repository like GitHub or GitLab or consumption of services metrics or download of software components metrics.

In some embodiments, the defect and quality score of the software components is computed by leveraging a combination of code scanning to identify defects, listed issues and defects from the software components provider site as well as public forums and using machine learning to normalize reviews of the software components number of reported defects.

In an embodiment, the support score is computed based on number of questions raised in public forums and a time period of answering the questions by a provider of the software component.

In some embodiments, the security and vulnerability score are computed based on code scanning to identify security bugs, vulnerabilities listed in sites such as CVE and using machine learning to normalize the number of reviews of the software component and number of reported vulnerabilities of the software component.

In further embodiments, the rank for each of the software component is determined based on the information from the repository stars rating service, the releases rating service, the forks rating service, the defect rating service, the Q&A rating service, the vulnerability rating service and using machine learning techniques to apply the user preferences to generate the ranking of the software components.

In some embodiments, crawling the internet sources further comprising crawling public repositories, cloud providers, Q&A, review sites, vulnerability databases to parse and store information on popularity, releases, forks, quality, support, and security information of the software components into the File Storage.

One implementation of the present disclosure is a system to for automatically generating search list rankings of software components. The system includes one or more processors and memory storing instructions that, when executed by the one or more processors, cause the one or more processors to perform operations. The operations include generating a list of software components in response to a request, generating a number of ranking parameters, determining a first number of weight values correlating with each of the number of ranking parameters, generating an index correlating each of the number of software components with each of the number of ranking parameters, parsing web data to populate the index, determining, via the ranking parameters, a number of scores for each of the number of software components, storing the scores on the index, applying the first number of weight values to the number of scores on the index, and generating, for each of the software components, a combined score, wherein the combined score is a combination of each of the number of scores that are associated with each of the number of software components.

In some embodiments, the ranking parameters include a popularity score, a release score, a detect and quality score, a support score, a fork and download score, a Q&A score and a security and vulnerability score. The release score is a standardized measurement relative to a frequency of updates of a software component. The popularity score is a standardized measurement relative to a popularity of a software component. The fork and download score is a standardized measurement relative to a number of downloads associated with a software component over a fixed period of time. The defect and quality score is a standardized measurement relative to an amount of defects logged in association with a software component. The Q&A score is a standardized measurement relative to the amount of activity logged in association with a provision of customer support associated with a software component.

In some embodiments, the popularity score, the release score, the detect and quality score, the support score, the fork and download score, the Q&A score and the security and vulnerability score are normalized across provider data and third party data by a machine learning model.

In some embodiments, the fork and download score is determined based on a number of user downloads of a software component across different providers of the software component, the different providers of the software component including a number of code repositories.

In some embodiments, the Q&A score is based on a number of questions raised in public forums regarding a software component and a time period elapsed before a service provider provides a response.

In some embodiments, the operations include monitoring one or more test software components, periodically determining, via the number of ranking parameters, a number of test scores associated with the one or more test software components, extracting circumstantial web data regarding the number of test scores, generating training data including interpreted correlations between the extracted circumstantial data and the number of test scores, and training a machine learning model using the training data, wherein the trained machine learning model is configured to update the weight values.

In some embodiments, the circumstantial web data includes data collected from news media, social media, and economic forecasts.

In some embodiments, the web data includes scanning, by a data-crawler, public repositories, cloud providers, Q&A, review sites, vulnerability databases to retrieve information on popularity, releases, forks, quality, support, and security information regarding a software component, and storing, by the data-crawler, the information to the index, wherein the index is configured to operate as file storage.

Another implementation of the present disclosure relates to a method for automatically generating search list rankings of software components. The method includes generating a list of software components in response to a request, generating a number of ranking parameters, determining a first number of weight values correlating with each of the number of ranking parameters, generating an index correlating each of the number of software components with each of the number of ranking parameters, parsing web data to populate the index, determining, via the ranking parameters, a number of scores for each of the number of software components, storing the scores on the index, applying the first number of weight values to the number of scores on the index, and generating, for each of the software components, a combined score, wherein the combined score is a combination of each of the number of scores that are associated with each of the number of software components.

In some embodiments, the method includes monitoring one or more test software components, periodically determining, via the number of ranking parameters, a number of test scores associated with the one or more test software components, extracting circumstantial web data regarding the number of test scores, generating training data including interpreted correlations between the extracted circumstantial data and the number of test scores, and training a machine learning model using the training data, wherein the trained machine learning model is configured to update the weight values.

In some embodiments, the web data includes scanning, by a data-crawler, public repositories, cloud providers, Q&A, review sites, vulnerability databases to retrieve information on popularity, releases, forks, quality, support, and security information regarding a software component, and storing, by the data-crawler, the information to the index, wherein the index is configured to operate as file storage.

In some embodiments, the circumstantial web data includes data collected from news media, social media, and economic forecasts.

Another implementation of the present disclosure relates to one or more non-transitory computer-readable media storing instructions thereon. The instructions, when executed by one or more processors, cause the one or more processors to generate a list of software components in response to a request, generate a number of ranking parameters, determine a first number of weight values correlating with each of the number of ranking parameters, generate an index correlating each of the number of software components with each of the number of ranking parameters, parse web data to populate the index, determine, via the ranking parameters, a number of scores for each of the number of software components, store the scores on the index, apply the first number of weight values to the number of scores on the index, and generate, for each of the software components, a combined score, wherein the combined score is a combination of each of the number of scores that are associated with each of the number of software components.

In some embodiments, the ranking parameters include a popularity score, a release score, a detect and quality score, a support score, a fork and download score, a Q&A score and a security and vulnerability score. The release score is a standardized measurement relative to a frequency of updates of a software component. The popularity score is a standardized measurement relative to a popularity of a software component. The fork and download score is a standardized measurement relative to a number of downloads associated with a software component over a fixed period of time. The defect and quality score is a standardized measurement relative to an amount of defects logged in association with a software component. The Q&A score is a standardized measurement relative to the amount of activity logged in association with a provision of customer support associated with a software component.

In some embodiments, the popularity score, the release score, the detect and quality score, the support score, the fork and download score, the Q&A score and the security and vulnerability score are normalized across provider data and third party data by a machine learning model.

In some embodiments, the fork and download score is determined based on a number of user downloads of a software component across different providers of the software component, the different providers of the software component including a number of code repositories.

In some embodiments, the Q&A score is based on a number of questions raised in public forums regarding a software component and a time period elapsed before a service provider provides a response.

In some embodiments, the instructions cause the processor to monitor one or more test software components, periodically determine, via the number of ranking parameters, a number of test scores associated with the one or more test software components, extract circumstantial web data regarding the number of test scores, generate training data including interpreted correlations between the extracted circumstantial data and the number of test scores; and train a machine learning model using the training data, wherein the trained machine learning model is configured to update the weight values.

In some embodiments, the circumstantial web data includes data collected from news media, social media, and economic forecasts.

In some embodiments, parsing the web data includes scanning, by a data-crawler, public repositories, cloud providers, Q&A, review sites, vulnerability databases to retrieve information on popularity, releases, forks, quality, support, and security information regarding a software component, and storing, by the data-crawler, the information to the index, wherein the index is configured to operate as file storage.

BRIEF DESCRIPTION OF THE DRAWINGS

The following drawings are illustrative of particular examples for enabling systems and methods of the present disclosure, are descriptive of some of the methods and mechanism, and are not intended to limit the scope of the invention. The drawings are not to scale (unless so stated) and are intended for use in conjunction with the explanations in the following detailed description.

Figure 1:
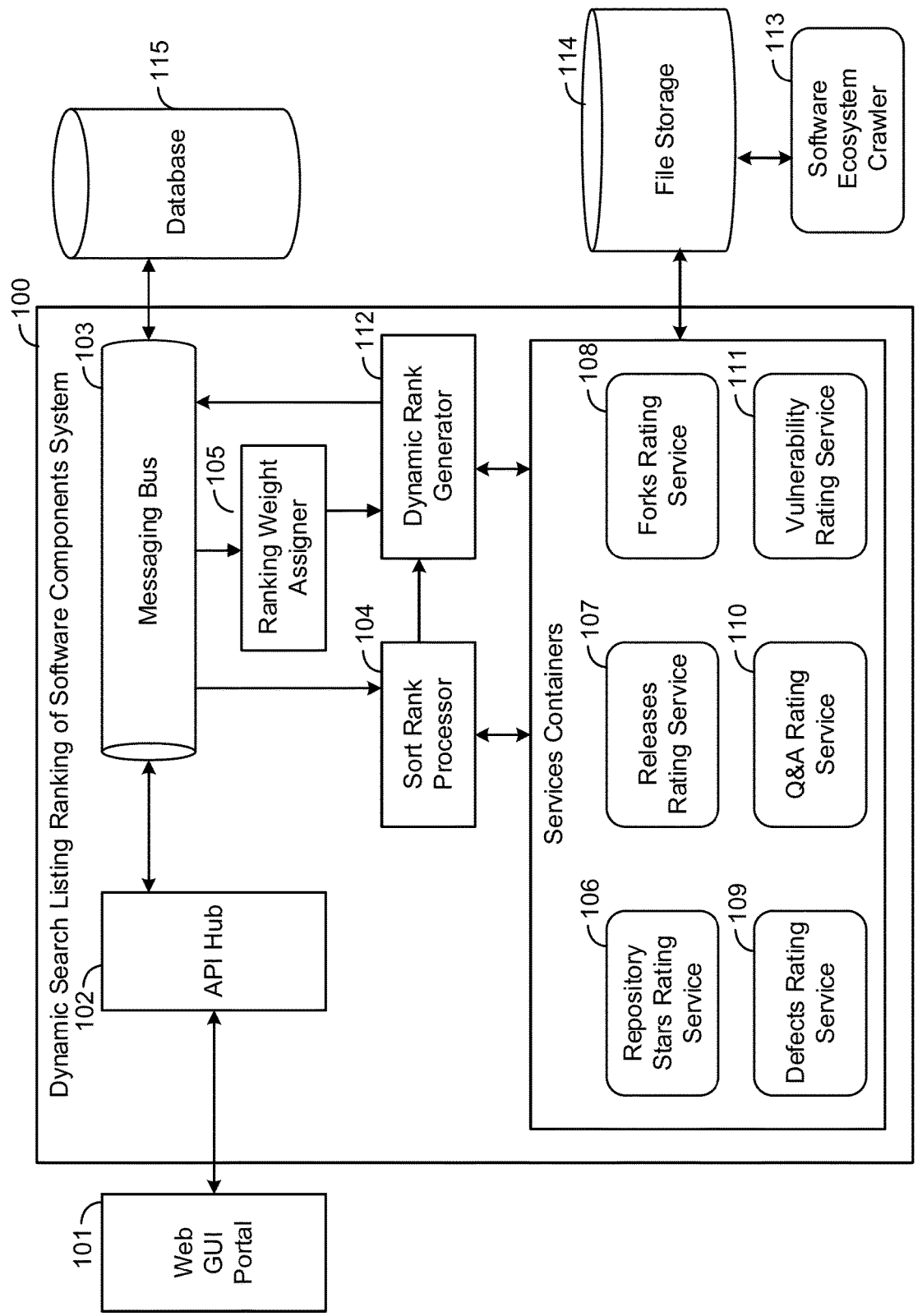
FIG. 1 shows an example high-level architecture of a system to perform dynamic search listing ranking of software components, according to some embodiments.

Persons skilled in the art will appreciate that elements in the figures are illustrated for simplicity and clarity and may represent both hardware and software components of the system. Further, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION

Exemplary embodiments now will be described. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

In the current state of the art, to select a software component, a developer relies on ratings on user information of the software component. The developer must check various websites and manually scan through the user reviews to determine if the software component is good to use. At a point in time, there may be plurality of software components available for a particular project the developer is working on. The developer must go through all the available information for all the possible software component to select the most appropriate software component. Thus, the entire processes become tiresome and time inefficient.

The present subject matter discloses a method and system for generating a dynamic search listing ranking of software components. In some embodiments, to help the developer choose a right software component based on its ecosystem activity, a system of the present subject matter will compute scores for popularity, release frequency, usage by others, defects, questions answered and support and security vulnerabilities of the software component. The computed score is then used to prioritize and rank the software components based on the developer preferences, thereby eliminating significant search effort across multiple sites for Q&A, reviews, security, defects, and popularity. This will also reduce any manual and/or interpretation errors and help the developer choose the right software component every time.

FIG. 1 shows an example high-level architecture of system 100 to perform dynamic search listing ranking of software components, according to some embodiments. The system 100 includes an application programming interface (API) hub 102, a messaging bus 103, a sort rank processor 104, a rank weight assigner 105, a repository stars rating service 106, a releases rating service 107, a forks rating service 108, a defect rating service 109, a Q&A rating service 110, a vulnerability rating service 111, a dynamic rank generator 112, a software ecosystem crawler 113, a file storage 114, a database 115 and a search system 101 to perform the task of dynamic search listing ranking of software components given the list of software components that is potentially generated from the search system 101.

In some embodiments, the search system 101 captures and transmits a search request, ranking needs, and user preferences to the system 100. For example, the search system 101 may capture the search request, ranking needs, and user preferences inputted by a user. After processing of the request, the search system 101 will incorporate and display the listing that it receives.

The request from search system 101 is transmitted to the API hub 102, which acts as a gateway for accepting and transmitting all requests. The API hub 102 hosts web services for receiving the requests and creating request messages to provide to the messaging bus 103. The messaging bus 103 is used to generate a filter based on the search request, ranking needs, and user preferences. The filter may be used to pull out an initial list of software components. The messaging bus 103 supports event driven architecture, thereby enabling long running processes to be decoupled from requesting system's calls. This decoupling will help the system to service the request and notify calling system once the entire process of generating a filter is completed. The messaging bus 103 includes job listeners configured to listen to the messages in the messaging bus 103.

Based on the filter generated by the messaging bus 103, the sort rank processor 104 processes a list of software components from the search or a similar listing system and a request for ranking parameters for which ranking information is requested. For example, ranking parameters may be inputted by the user and captured by the search system 101. The ranking parameters may then be captured by the messaging hub and further the messaging hub 101 may transmit the ranking parameters to the sort rank processor 104. Based on the ranking parameters, the sort rank processor 104 calls all or some of a number of services such as the repository stars rating service 106, the releases rating service 107, the forks rating service 108, the defect rating service 109, the Q&A rating service 110, and the vulnerability rating service 111. The above mentioned repository stars rating service 106, releases rating service 107, forks rating service 108, defect rating service 109, Q&A rating service 110, and vulnerability rating service 111 may be referred to as "services", hereinafter. The services may generate scores for ranking parameters of the software components. The sort rank processor 104 then collates the ranking score from these services and returns a pair value along with the respective parameter. The generation of ranking score is described further in detail herein.

The rank weight assigner 105 leverages machine learning technologies to compute weights or priorities of the different ranking parameters including, but not limited to a popularity score of a software component, a release score of the software component, a fork and download score of the software component, a release score of the software component, a defect and quality score of a software component, a support score of a software component, a security and vulnerability score of a software component. The score of ranking parameters are computed based on the ranking request, the component, and the user preferences of this user and/ or all other users using similar software components. For example, equal weight may be assigned to all the ranking parameters while in another example, some ranking parameters may be assigned more weight than the other ranking parameters. In an example, the ranking weight assigner 105 may assign weight based on a predetermined criteria or as indicated in case-to-case basis.

In some embodiments, a software ecosystem crawler 113 crawls the internet sources including, but not limited to, public repositories, cloud providers, Q&A, review sites, and vulnerability databases to parse and store information on popularity, releases, forks, quality, support, and security information into the file storage 114. The information stored in the file storage 114 may be used by the services to determine scores of various ranking parameters.

In some embodiments, the repository stars rating service 106 leverages machine learning technologies to calculate the popularity score of software components from the list of the software components based on the information saved in the file storage 114. The repository stars rating service 106 determines ratings, such as number of stars or other forms of popularity ranking of the software component across different provider metrics as well as third party software component rating services to determine the popularity score of the software components. Thereafter the ratings across diverse sources for the software components are utilized.

In some embodiments, the releases rating service 107 computes a release score of the software components based on the release frequency of the software component and frequency of release of updates of the software components. The releases rating service 107 access the information stored in the file storage 114 to determine the release frequency of the software component or the frequency of release of updates. The release frequency of the software components and the frequency of release of updated of the software components signifies that the software component is being supported well with multiple releases.

In some embodiments, the forks rating service 108 computes a fork and download score of the software components based on the information stored in the file storage 114. The fork and download score indicates the usage rating for a software component based on number of downloads of the software components across different providers. This is signified by the number of forks in a software code repository, such as GitHub or GitLab. Other providers may track this as a consumption of services or download of software components. All this information is used by the forks rating service 108 to compute the fork and download score of the respective software components.

In some embodiments, the defect rating service 109 computes a defect and quality score of the software components by leveraging a combination of code scanning to identify defects, listed issues and defects from the software components provider site as well as public forums. The computation may be processed based on the information stored in the file storage 114. The defect rating service 109 uses machine learning to normalize the fact that more popular software components are reviewed more and hence have higher defects reported whereas rarely used software components may have no defects reported though they may contain some. Thus, based on the number of reviews and number of defects reported, the defects rating service 109 may compute the defect and quality score of the software components.

In some embodiments, the Q&A rating service 110 computes a support score for the software components based on how many questions are raised in public forums about the software components and how soon and how well the questions are answered by the provider of the software components or other users. To compute the support score, the Q&A rating service 110 access the file storage 114 and analyzes the data to determine the support score of the software component.

In some embodiments, the vulnerability rating service 111 computes a security and vulnerability score of the software components based on code scanning and based on the information stored in the file storage 114. The security and vulnerability score is used to identify security bugs, or vulnerabilities listed in sites such as CVE. The security and vulnerability score use machine learning to normalize the fact that more popular software components are reviewed more and hence have higher vulnerabilities reported whereas rarely used software components may have no vulnerability reported though they may contain some.

In some embodiments, based on the scores generated by the different services as described above and the weights assigned to each of the ranking parameter scores, the dynamic rank generator 112 computes the rank for each software component. The dynamic rank generator 112 may analyze the scores of each of the ranking parameters to determine a rank of the software components. Based on the score of the ranking parameters, the dynamic rank generator 112 may determine the rank of the software components. The top ranked software component may be presented as the best software component for the user. In an example, it is possible that multiple components might have the same rank based on the score of the ranking parameters. In such cases, the dynamic rank generator 112 uses machine learning techniques to apply the user preferences to generate the ranking. In an example, after it is determined that the two-software component has same rank, the system 100 may prompt the user to input the user preference and, based on the user preference, the dynamic rank generator 112 may decide the rank of the software components that would otherwise have identical ranks.

In some embodiment, and as explained above, the file storage 114 stores the information retrieved by the software ecosystem crawler 112. Further, the file storage 114 is used to store document type of data, source code files, documents, readme files, installation guides, user guides, neural network models etc.

Further, in some embodiments, the database 115 is a relational database management system RDBS database, such as MySQL, and functions to store all meta-data pertaining to the requests received from the search system, messaging bus, request processor and from other system components described above. The meta-data includes details of every request to identify the user submitting the request, and other details to track the progress as the system processes the request through its different tasks. The status of each execution step of complete process is stored in this database to track and notify the system on completion.

Figure 2:
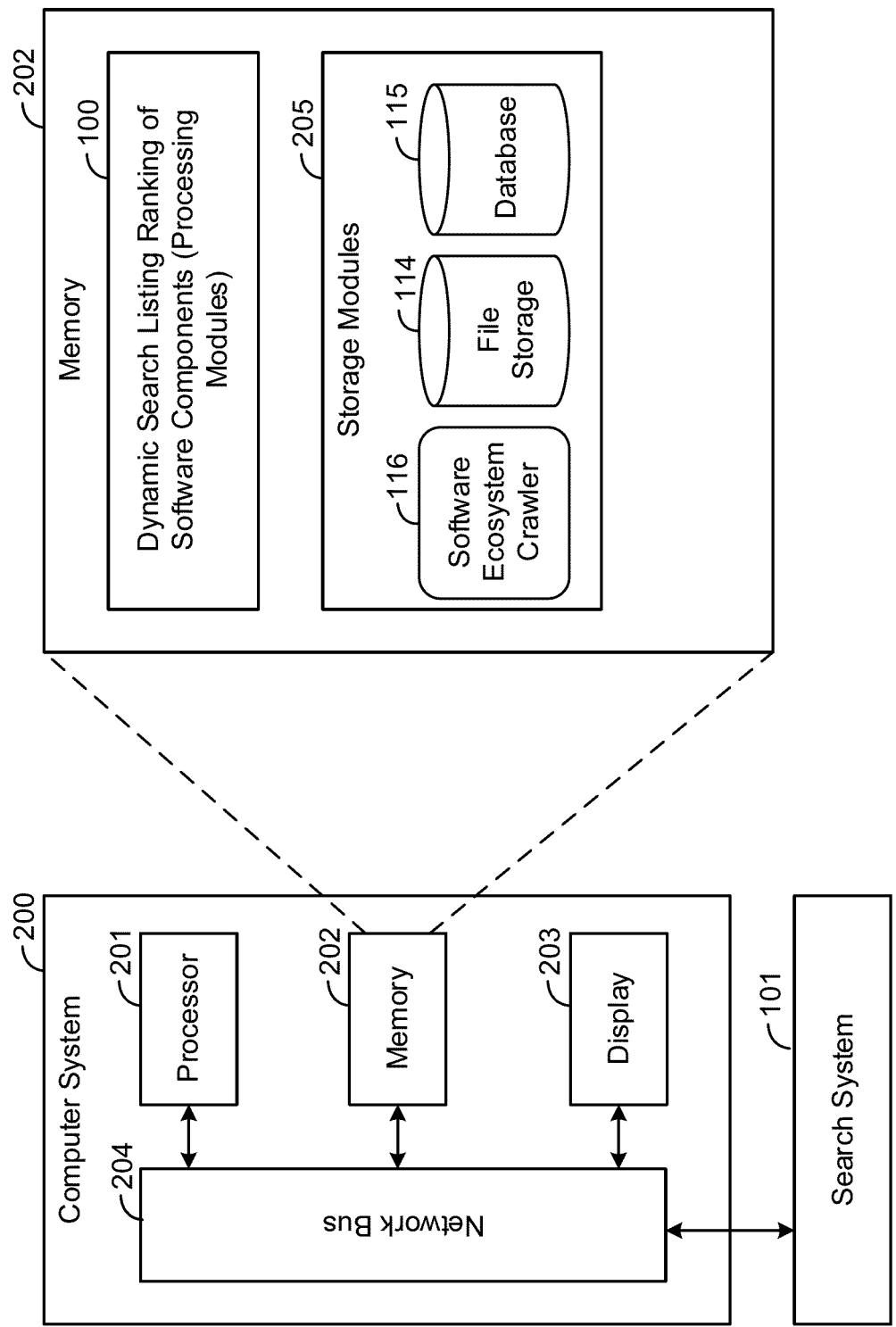
FIG. 2 shows a block view of a computer system implementation performing dynamic search listing ranking of software components, according to some embodiments.

FIG. 2 shows a block view of a computer system implementation 200 performing dynamic search listing ranking of software components, according to some embodiments. This may include a processor 201, memory 202, display 203, network bus 204, and other input/output like a mic, speaker, wireless card etc. The dynamic search listing ranking of software components modules 100, file storage 114, database 115, software ecosystem crawler 116 are stored in the memory 202 which provides the necessary machine instructions to the processor 201 to perform the executions for dynamic search listing ranking of software components. In embodiments, the processor 201 controls the overall operation of the system and manages the communication between the components through the network bus 204. The memory 202 holds the dynamic search listing ranking of software components system code, data, and instructions of the system processing modules 100 and several types of the non-volatile memory and volatile memory. The external search system 101 interacts with the computer system via the network bus 204.

Figure 3:
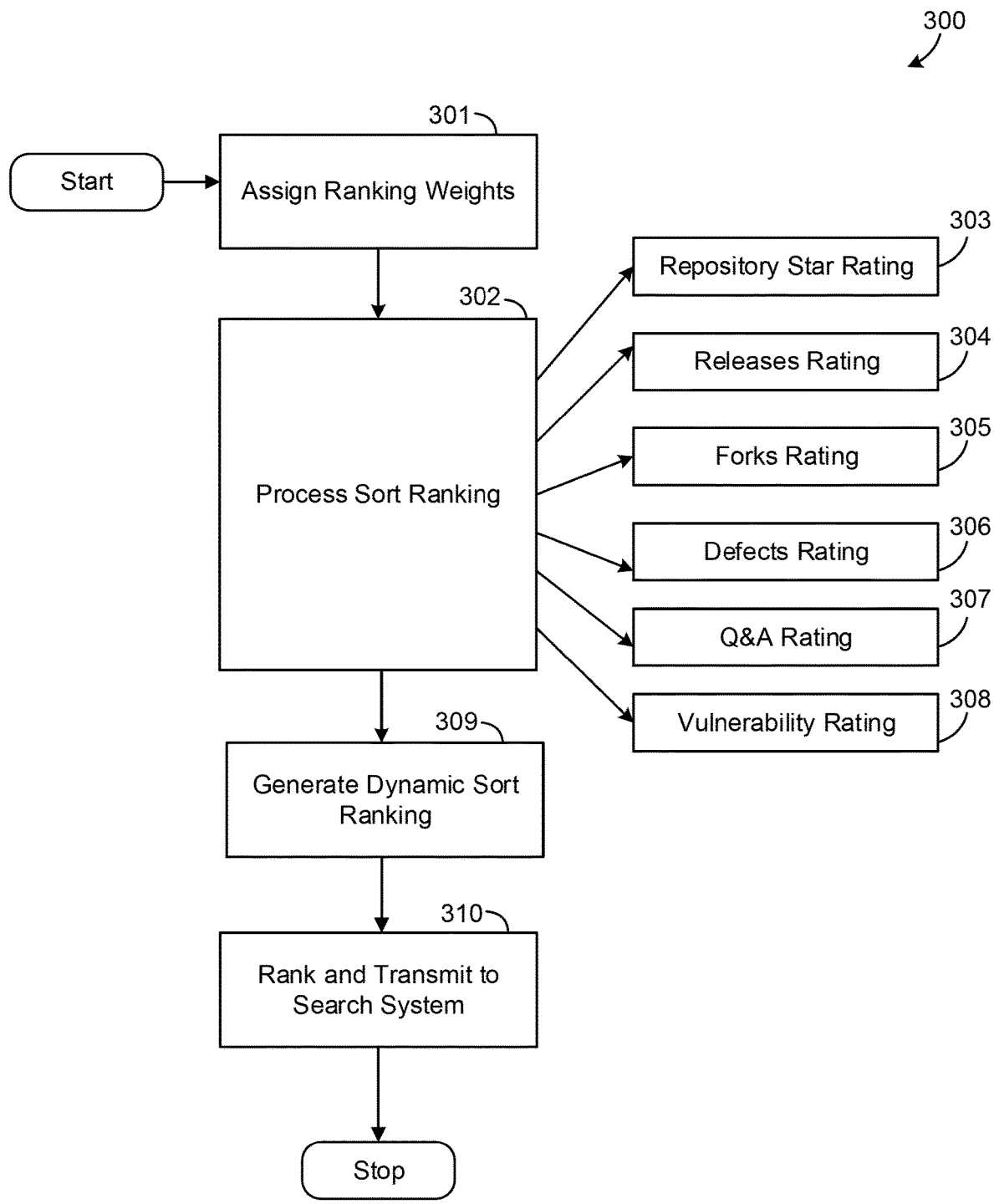
FIG. 3 shows a process for generating dynamic search listing ranking of software components, according to some embodiments.

FIG. 3 shows a process for dynamic search listing ranking of software components, according to some embodiments. It should be understood that the method steps are shown as a reference only and sequence of the method steps should not be construed as limiting. The method steps can include any additional steps in any order. Although the process 300 may be implemented in any system, the process 300 as shown is provided in reference to the system 100 for ease of explanation.

In step 301, the input component list as well as user preferences and the ranking parameters are captured from the search system and weights are assigned to the ranking parameters based on the user preferences, software component list and ranking request. In step 302, the process of sorting of rank of the software components is done. To perform step 302, different rating services are called based on non-zero weighted ranking parameters. In step 303 the popularity score is computed. In step 304, the release score is computed. In step 305, the fork and download score is computed based on forks or downloads. In step 306, the defect and quality score are computed. In step 307, the support score based on Q&A information is computed. In step 308, the security and vulnerability score are computed. In step 309, based on all the scores and the individual weights, the ranking for each software component is computed. In step 310, the list of software components is sorted and ranked based on the dynamic sort ranking scores and is transmitted to the search system.

Figure 4:
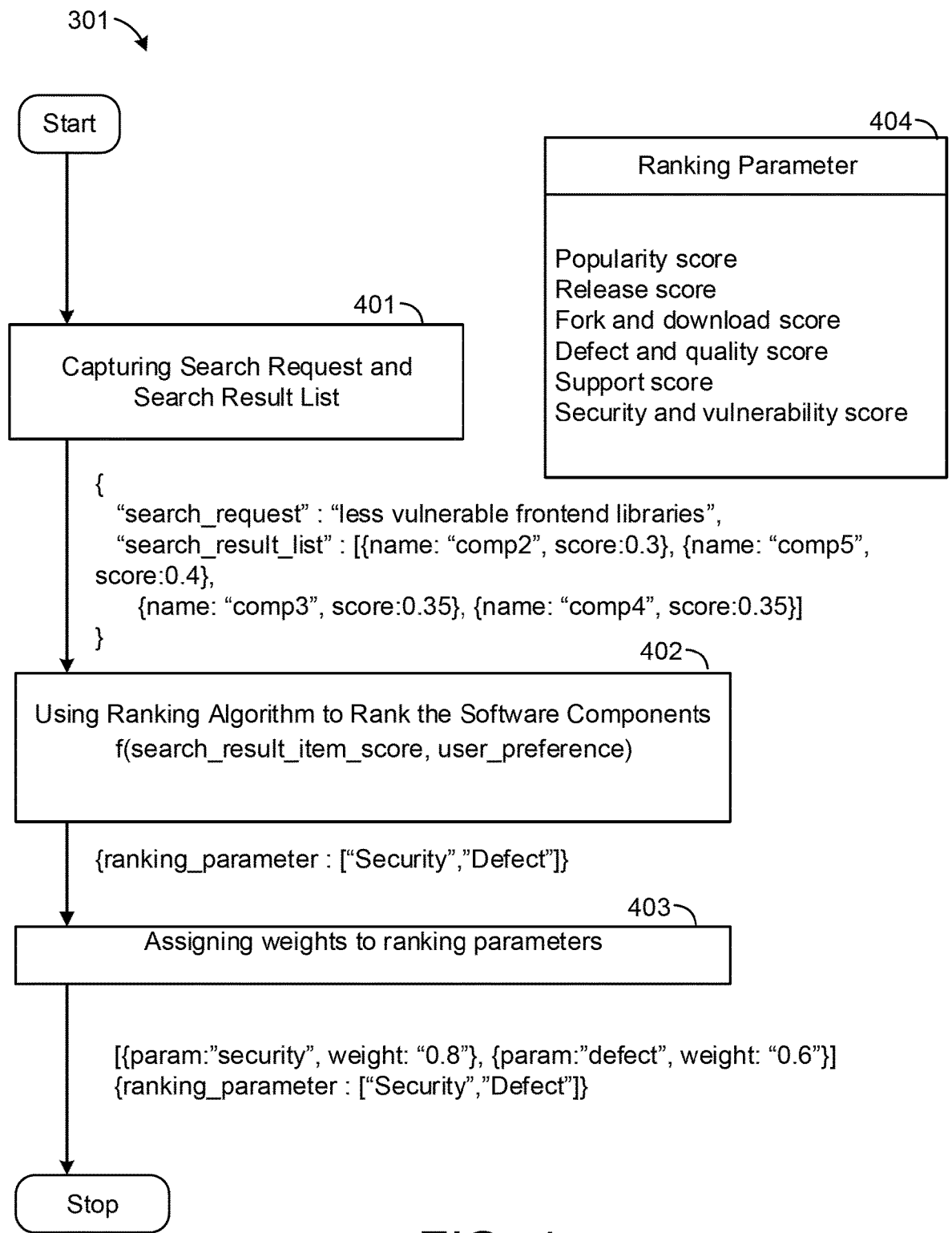
FIG. 4 shows a process of using ranking parameters for dynamic search listing ranking of software components, according to some embodiments.

FIG. 4 illustrates step 301 of process 300 in greater detail and can be performed to assign ranking weights used in dynamic search listing ranking of software components, according to some embodiments. It should be understood that the method steps are shown as a reference only and sequence of the method steps should not be construed as limitation. The method steps can include any additional steps in any order.

In some embodiments, in step 401, the input search request and search result list are captured from the search system. The input search text is used to determine ranking parameters. The ranking parameters include a popularity score of a software component, a release score of the software component, a fork and download score of the software component, a defect and quality score of a software component, a support score of a software component, a security and vulnerability score of a software component. In step 402 the ranking parameters are identified based on the received input search request. The step 402 uses a multi label classification machine learning model trained on historical search query dataset as well as human annotated dataset. The multi label classification model tries to classify the search query into any of the categories such as popularity, release, fork, defect, support, security, etc. These categories are set to ranking parameters. For example, for the search query "less vulnerable frontend libraries" the ranking parameters are set as "Security" and "Defect." The sample json output structure from step 402 is shown below:

```
{
    "query" : "less vulnerable frontend libraries",
    "ranking_parameter" : ["Security","Defect"]
}
```

In some embodiments, in step 403, the ranking parameters which were identified in the step 401 are assigned with weights. These weights may assist in identifying the right ranking option to the input query. Higher weight is assigned to first item of ranking parameter list retrieved from step 402. Subsequent weights in a gradual decreasing order are assigned to the subsequent items in the ranking parameter list. For example, for the search query "less vulnerable frontend libraries," the following is the output from the step 403:

```
{
    ranking_parameter : ["Security","Defect"],
    "ranking_param_weight" : [{param:"security", weight: "0.8"},
    {param:"defect", weight: "0.6"}]
}
```

Figure 5:
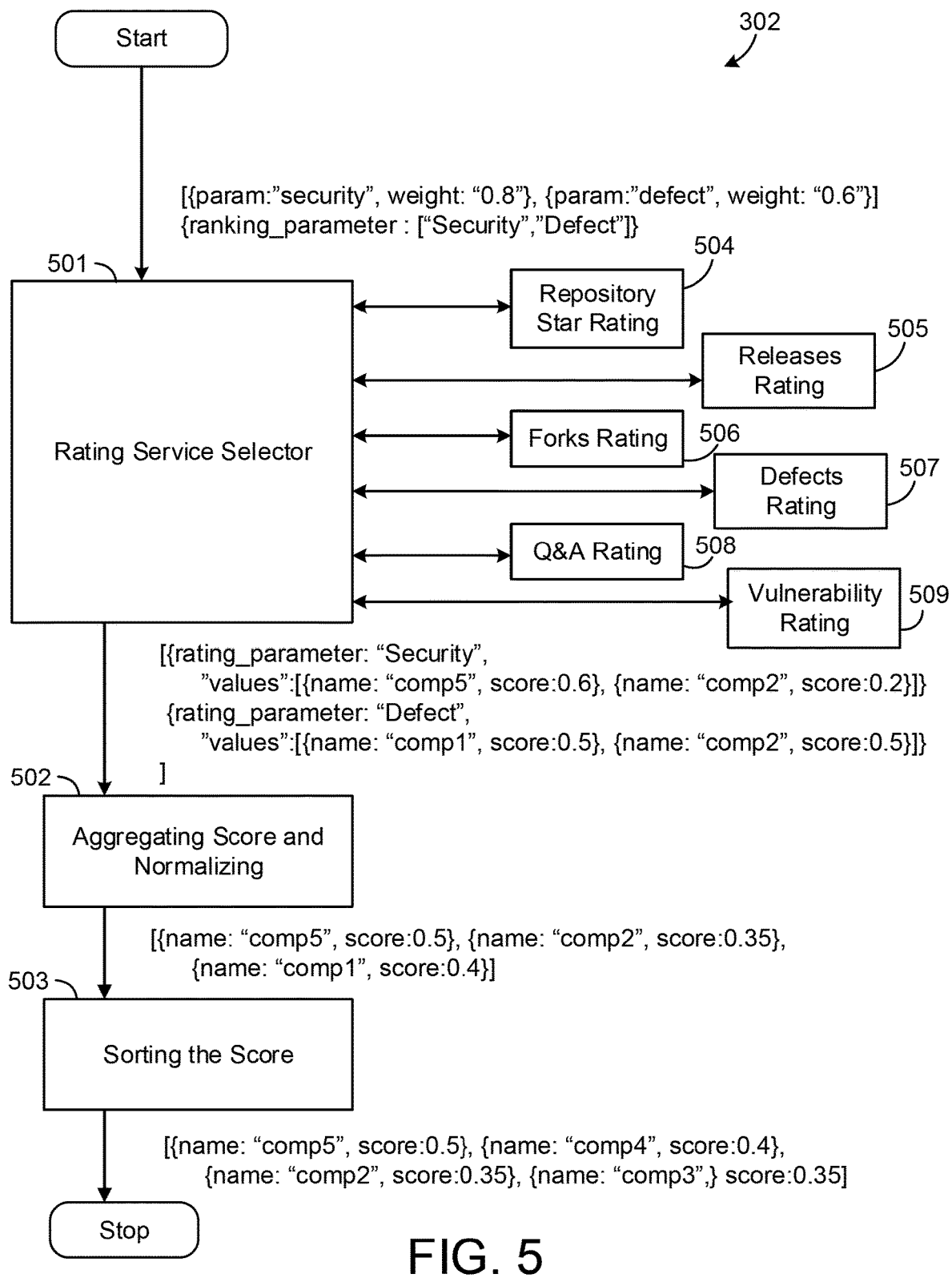
FIG. 5 shows a process for implementing a sorting method for dynamic search listing ranking of software components, according to some embodiments.

FIG. 5 illustrates step 302 of process 300 in greater detail and can be performed to process the sort ranking used in dynamic search listing ranking of software components, according to some embodiments. It should be understood that the process steps are shown as a reference only and sequence of the method steps should not be construed as limitation. The method steps can include any additional steps in any order. In an example, a one processor may execute a stored program comprising a sequence of program instructions that enables the processor to perform the method of the present subject matter. The computer program may be stored in a computer readable medium.

In some embodiments, in step 501, a rating service selector selects different rating services such as repository star rating 504, release rating 505, forks rating 506, defects rating 507, Q&A rating 508, and vulnerability rating 509 based on the ranking parameter categories identified. Step 501 provides the search result list with rating scores to an appropriate ranking parameter category list. Any search result items which are not part of the rating selector are placed under an "other" category. For example, for the search query "less vulnerable frontend libraries" and ranking parameter "Security" and "Defect," the sample rating service selector output will be as given below.

```
[
    {
    "rating_parameter" : "Security",
    "values":[{name: "comp5", score:0.6}, {name: "comp2", score:0.2}...]
    },
    {
    "rating_parameter" : "Defect",
    "values":[{name: "comp1", score:0.5}, {name: "comp2", score:0.5}...]
    }
    {
    "rating_parameter": "Others",
    "values":[{name: "comp7", score:0.3}, {name: "comp8", score:0.2}...]
    }
]
```

In some embodiments, in step 502, the rating scores produced by step 501 are aggregated against the name field, and the scores are added and normalized to unit normalization. After the data is processed, the sample output may appear as shown below. In this example, rating scores associated with a name "comp2" are combined together with a single score of 0.35.

```
[
    {"name": "comp5", score:0.5}, {"name": "comp2", score:0.35},
    {"name": "comp1", score:0.4}, {"name" : "comp7", score:0.3},
    {"name": "comp8", score:0.2}...
]
```

In some embodiments, in step 503, the scores are sorted in descending order to provide the ranking to search listing of software components. For example, the following may be an output of step 503.

```
[
    {"name": "comp5", score:0.5}, {"name": "comp1", score:0.4},
    {"name": "comp2", score:0.35}, {"name" : "comp7", score:0.3},
    {"name": "comp8", score:0.2}...
]
```

Figure 6:
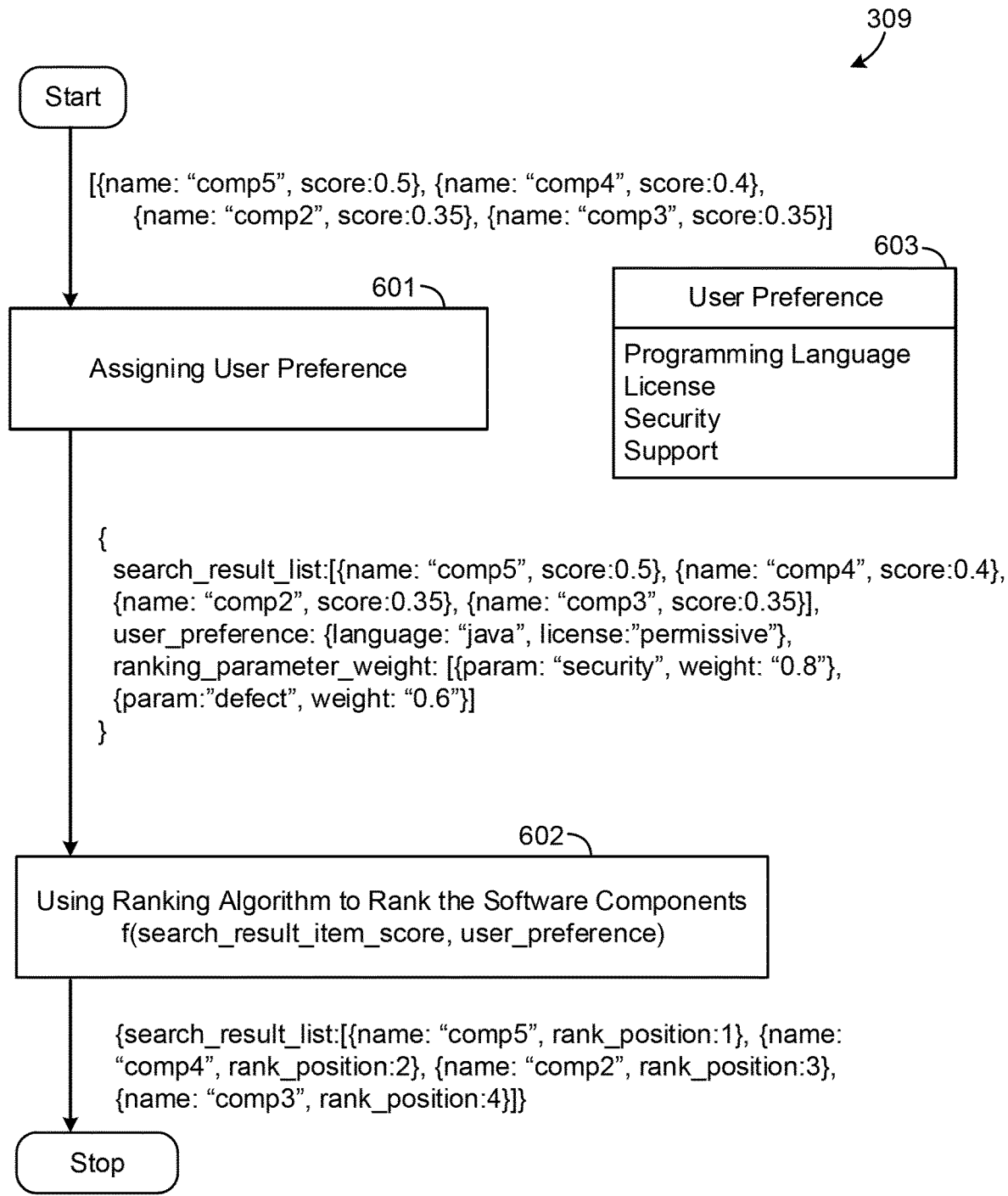
FIG. 6 shows a process for summarizing dynamic search listing ranking of software components, according to some embodiments.

FIG. 6 illustrates step 309 of process 300 in greater detail and can be performed to summarize dynamic search listing ranking of software components, according to some embodiments. It should be understood that the method steps are shown as a reference only and sequence of the method steps should not be construed as limitation. The method steps can include any additional steps in any order.

In some embodiments, in step 601, user preferences such as programming language, license, security and support are taken into account for search list ranking. A user preference is collected from a user directly during the user's sign up to the search system. The user preference is also built indirectly when the user selects a search result item from the search result page. For example, if the user selects a software component from search result page then the component's attributes such as programming language, security, license and support are added to user preference. If the user is anonymous, then an anonymous user preference profile may be created. A sample output from step 601 is shown below. As shown, the search_result_list field is the output from process step 302 (e.g., step 503) and ranking_parameter_weight is the output from process step 301 (e.g., step 403). The field "user_preference" holds the preferences set by the use either directly or indirectly.

```
{
    "search_result_list" : [{name: "comp5", score:0.5}, {name: "comp4",
    score:0.4},{name: "comp2", score:0.35}, {name: "comp3", score:0.35}],
    "user_preference" : { language: "java", license:"permissive" },
```

```
"ranking_parameter_weight":[{param:"security",weight:"0.8"},{param:"defect",
    weight: "0.6"}]
}
```

In some embodiments, in step 602, a ranking model is used to improve the relevance ranking of the search result list. This model is built from a historical search query dataset as well as a human annotated dataset with additional features such as software components name, readme text, description and rating scores. The ranking model ranks search result list based on the search query relevance. Finally, a user preference which was determined in step 601 may be used to re-rank the result list based on user preference, if it exists. The sample output from this step is provided below.

```
{
    search_result_list: [{name: "comp5", rank_position:1}, {name: "comp4",
    rank_position:2},{name: "comp2", rank_position:3}, {name: "comp3",
    rank_position:4}]
}
```

Figure 7A:
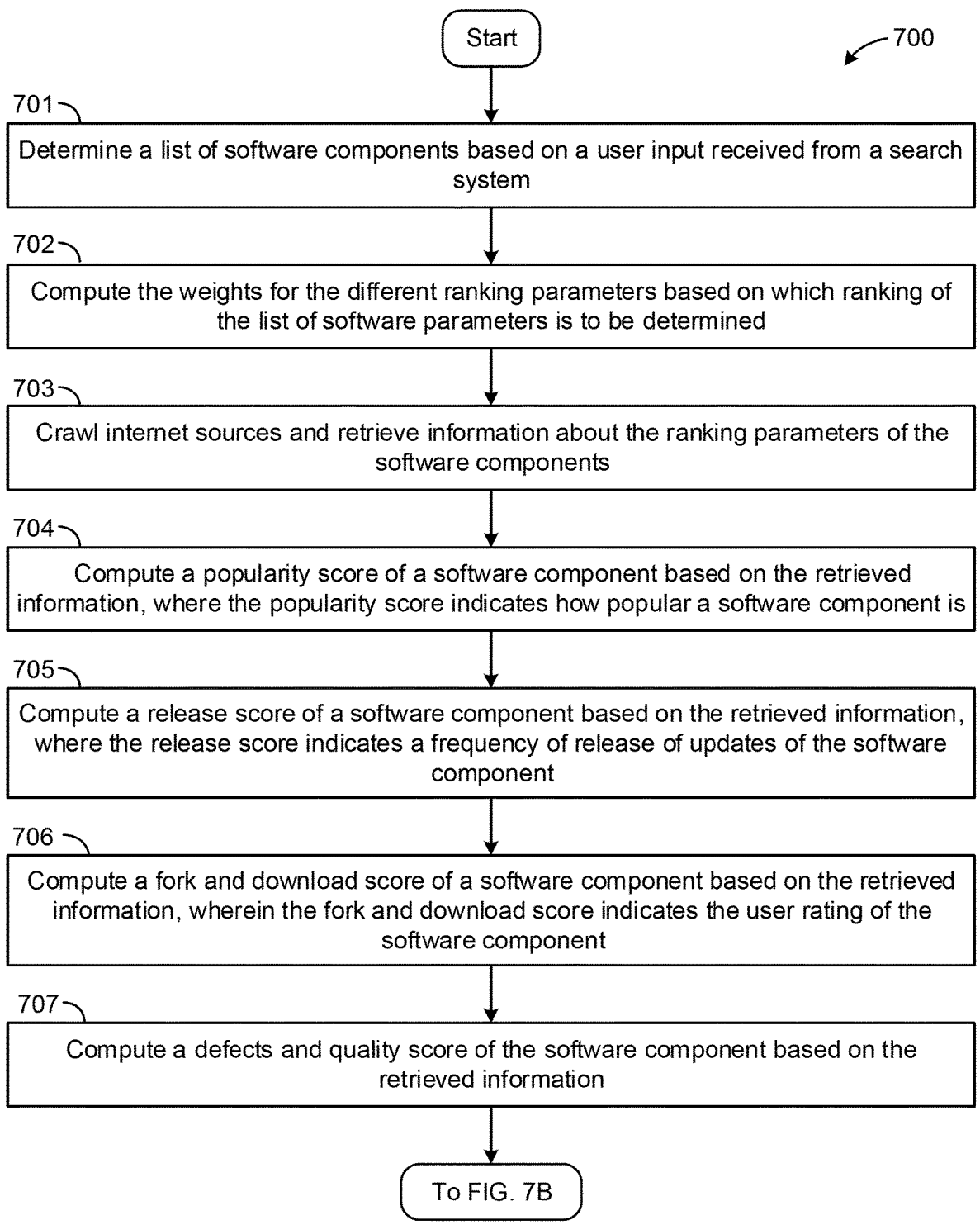
FIGS. 7A-7B show a high-level process for dynamic search listing ranking of software components, according to some embodiments.
Figure 7B:
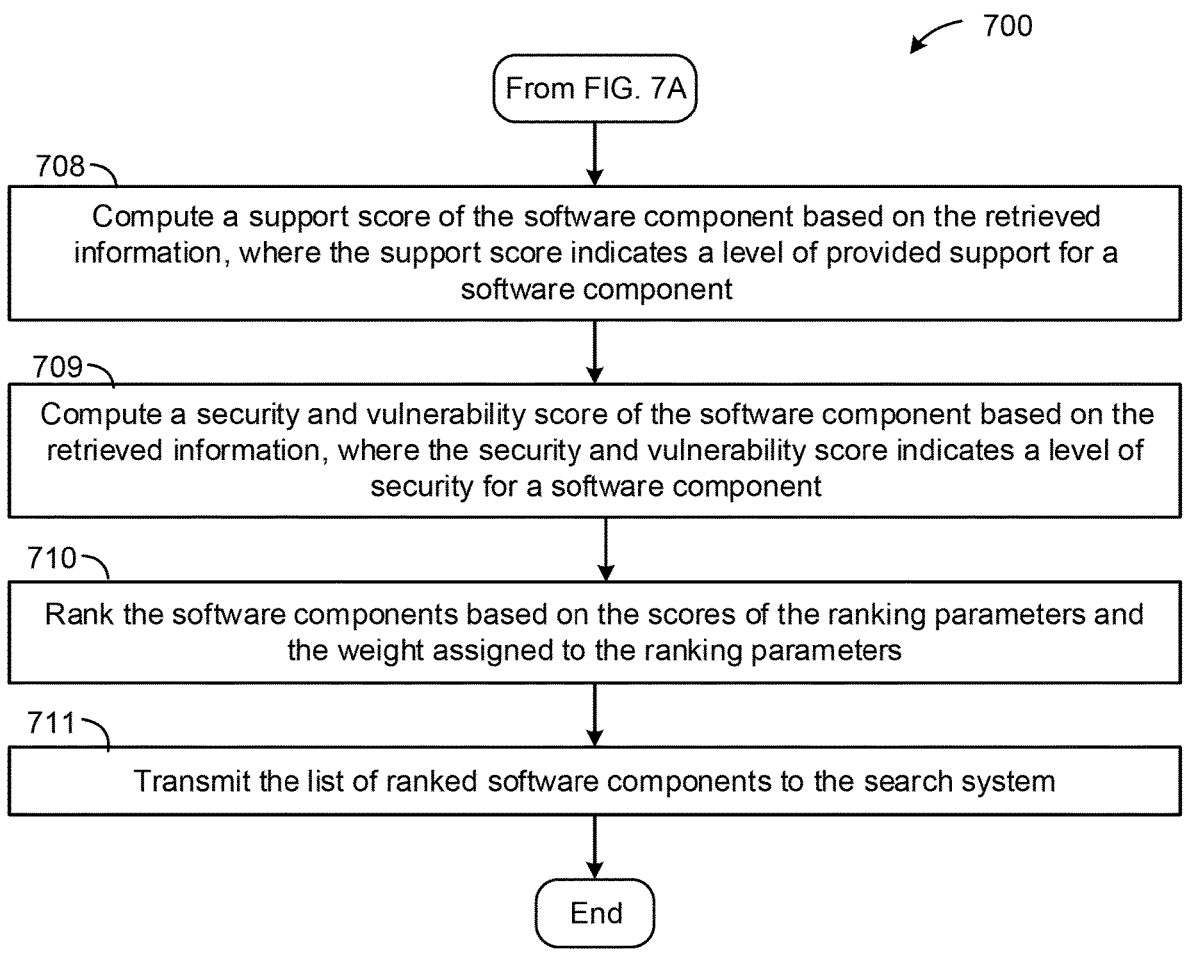

FIGS. 7A-7B show a high-level process 700 for dynamic search listing ranking of software components, according to some embodiments. It should be understood that the method steps are shown as a reference only and sequence of the method steps should not be construed as limitation. The method steps can include any additional steps in any order. Although, the process 700 may be implemented in any system, the example process 700 is provided in reference to the system 100 for ease of explanation.

In some embodiments, in the step 701, a list of software component is determined based on a user input. In an example, the user input as well as user preferences and ranking parameters are captured from a search system. At step 702, the weights for the different ranking parameters based on which the ranking of the list of the software components is to be determined is computed. The ranking parameters include a popularity score of a software component, a release score of the software component, a fork and download score of the software component, a release score of the software component, a defect and quality score of a software component, a support score of a software component, a security and vulnerability score of a software component. In an example, weights are assigned based on the user preferences, software component list and ranking request. At step 703, internet sources are crawled and information about the non-zero weighted ranking parameters are retrieved. The information may be saved in a storage, such as file storage 114. At step 704, a popularity score for each of the software components is computed based on the retrieved information, wherein the popularity score indicates how popular a software component is. At step 705, a release score of the software components is computed based on the retrieved information, wherein the release score indicates about frequency of release of updates of a software component. At step 706, the fork and download score of a software component is determined based on the retrieved information. At step 707, a defect and quality score of the software components is determined based on the retrieved information. At step 708, a support score of the software components is determined based on the retrieved information, wherein the support score indicates about provided support for a software component. At step 709, the security and vulnerability score of the software components computed based on the retrieved information, wherein the security and vulnerability score indicate about security of a software component. At step 710, the software components are ranked based on the scores of the ranking parameters and the weight assigned to the ranking parameters. In the step 711, the list of ranked software components is transmitted to the search system.

As will be appreciated by one of skilled in the art, the present disclosure may be embodied as a method and system. In the specification, there has been disclosed exemplary embodiments of the invention. Although specific terms are employed, they are used in a generic and descriptive sense only and not for purposes of limitation of the scope of the subject matter described herein.

What is claimed is:

1. A system for automatically generating search list rankings of software components, the system comprising:
    one or more processors and memory storing instructions that, when executed by the one or more processors, cause the one or more processors to perform operations comprising:
        generating a list of software components in response to a request;
        generating a plurality of ranking parameters;
        determining a first plurality of weight values correlating with each of the plurality of ranking parameters;
        generating an index correlating each of the plurality of software components with each of the plurality of ranking parameters;
        parsing web data to populate the index;
        determining, via the ranking parameters, a plurality of scores for each of the plurality of software components;
        storing the scores on the index;
        applying the first plurality of weight values to the plurality of scores on the index; and
        generating, for each of the software components, a combined score, wherein the combined score is a combination of each of the plurality of scores that are associated with each of the plurality of software components;
    wherein the ranking parameters comprise a popularity score, a release score, a detect and quality score, a support score, a fork and download score, a Q&A score and a security and vulnerability score, wherein:
        the release score is a standardized measurement relative to a frequency of updates of a software component;
        the popularity score is a standardized measurement relative to a popularity of a software component;

the fork and download score is a standardized measurement relative to a number of downloads associated with a software component over a fixed period of time;

the defect and quality score is a standardized measurement relative to an amount of defects logged in association with a software component; and the Q&A score is a standardized measurement relative to the amount of activity logged in association with a provision of customer support associated with a software component.

2. The system of claim 1, wherein the popularity score, the release score, the detect and quality score, the support score, the fork and download score, the Q&A score and the security and vulnerability score are normalized across provider data and third party data by a machine learning model.

3. The system of claim 1, wherein the fork and download score is determined based on a number of user downloads of a software component across different providers of the software component, the different providers of the software component comprising a plurality of code repositories.

4. The system of claim 1, wherein the Q&A score is based on a number of questions raised in public forums regarding a software component and a time period elapsed before a service provider provides a response.

5. A system for automatically generating search list rankings of software components, the system comprising:
one or more processors and memory storing instructions that, when executed by the one or more processors, cause the one or more processors to perform operations comprising:
generating a list of software components in response to a request;
generating a plurality of ranking parameters;
determining a first plurality of weight values correlating with each of the plurality of ranking parameters;
generating an index correlating each of the plurality of software components with each of the plurality of ranking parameters;
parsing web data to populate the index;
determining, via the ranking parameters, a plurality of scores for each of the plurality of software components;
storing the scores on the index;
applying the first plurality of weight values to the plurality of scores on the index;
generating, for each of the software components, a combined score, wherein the combined score is a combination of each of the plurality of scores that are associated with each of the plurality of software components;
monitoring one or more test software components;
periodically determining, via the plurality of ranking parameters, a plurality of test scores associated with the one or more test software components;
extracting circumstantial web data regarding the plurality of test scores;
generating training data comprising interpreted correlations between the extracted circumstantial data and the plurality of test scores; and
training a machine learning model using the training data, wherein the trained machine learning model is configured to update the weight values.

6. The system of claim 5, wherein the circumstantial web data comprises data collected from news media, social media, and economic forecasts.

7. A system for automatically generating search list rankings of software components, the system comprising:
one or more processors and memory storing instructions that, when executed by the one or more processors, cause the one or more processors to perform operations comprising:
generating a list of software components in response to a request;
generating a plurality of ranking parameters;
determining a first plurality of weight values correlating with each of the plurality of ranking parameters;
generating an index correlating each of the plurality of software components with each of the plurality of ranking parameters;
parsing web data to populate the index;
determining, via the ranking parameters, a plurality of scores for each of the plurality of software components;
storing the scores on the index;
applying the first plurality of weight values to the plurality of scores on the index; and
generating, for each of the software components, a combined score, wherein the combined score is a combination of each of the plurality of scores that are associated with each of the plurality of software components;
wherein parsing the web data comprises:
scanning, by a data-crawler, public repositories, cloud providers, Q&A, review sites, vulnerability databases to retrieve information on popularity, releases, forks, quality, support, and security information regarding a software component; and
storing, by the data-crawler, the information to the index, wherein the index is configured to operate as file storage.

8. A method for automatically generating search list rankings of software components, the method comprising:
generating a list of software components in response to a request;
generating a plurality of ranking parameters;
determining a first plurality of weight values correlating with each of the plurality of ranking parameters;
generating an index correlating each of the plurality of software components with each of the plurality of ranking parameters;
parsing web data to populate the index;
determining, via the ranking parameters, a plurality of scores for each of the plurality of software components;
storing the scores on the index;
applying the first plurality of weight values to the plurality of scores on the index;
generating, for each of the software components, a combined score, wherein the combined score is a combination of each of the plurality of scores that are associated with each of the plurality of software components;
monitoring one or more test software components;
periodically determining, via the plurality of ranking parameters, a plurality of test scores associated with the one or more test software components;
extracting circumstantial web data regarding the plurality of test scores;
generating training data comprising interpreted correlations between the extracted circumstantial data and the plurality of test scores; and training a machine learning model using the training data, wherein the trained machine learning model is configured to update the weight values.

9. The method of claim 8, wherein the circumstantial web data comprises data collected from news media, social media, and economic forecasts.

10. A method for automatically generating search list rankings of software components, the method comprising:
generating a list of software components in response to a request;
generating a plurality of ranking parameters;
determining a first plurality of weight values correlating with each of the plurality of ranking parameters;
generating an index correlating each of the plurality of software components with each of the plurality of ranking parameters;
parsing web data to populate the index;
determining, via the ranking parameters, a plurality of scores for each of the plurality of software components;
storing the scores on the index;
applying the first plurality of weight values to the plurality of scores on the index; and
generating, for each of the software components, a combined score, wherein the combined score is a combination of each of the plurality of scores that are associated with each of the plurality of software components;
wherein parsing the web data comprises:
scanning, by a data-crawler, public repositories, cloud providers, Q&A, review sites, vulnerability databases to retrieve information on popularity, releases, forks, quality, support, and security information regarding a software component; and
storing, by the data-crawler, the information to the index, wherein the index is configured to operate as file storage.

11. One or more non-transitory computer-readable media storing instructions thereon, wherein the instructions, when executed by one or more processors, cause the one or more processors to:
generate a list of software components in response to a request;
generate a plurality of ranking parameters;
determine a first plurality of weight values correlating with each of the plurality of ranking parameters;
generate an index correlating each of the plurality of software components with each of the plurality of ranking parameters;
parse web data to populate the index;
determine, via the ranking parameters, a plurality of scores for each of the plurality of software components;
store the scores on the index;
apply the first plurality of weight values to the plurality of scores on the index; and
generate, for each of the software components, a combined score, wherein the combined score is a combination of each of the plurality of scores that are associated with each of the plurality of software components;
wherein the ranking parameters comprise a popularity score, a release score, a detect and quality score, a support score, a fork and download score, a Q&A score and a security and vulnerability score, wherein:
the release score is a standardized measurement relative to a frequency of updates of a software component;
the popularity score is a standardized measurement relative to a popularity of a software component;
the fork and download score is a standardized measurement relative to a number of downloads associated with a software component over a fixed period of time;
the defect and quality score is a standardized measurement relative to an amount of defects logged in association with a software component; and
the Q&A score is a standardized measurement relative to the amount of activity logged in association with a provision of customer support associated with a software component.

12. The non-transitory computer-readable media of claim 11, wherein the popularity score, the release score, the detect and quality score, the support score, the fork and download score, the Q&A score and the security and vulnerability score are normalized across provider data and third party data by a machine learning model.

13. The non-transitory computer-readable media of claim 11, wherein the fork and download score is determined based on a number of user downloads of a software component across different providers of the software component, the different providers of the software component comprising a plurality of code repositories.

14. The non-transitory computer-readable media of claim 11, wherein the Q&A score is based on a number of questions raised in public forums regarding a software component and a time period elapsed before a service provider provides a response.

15. One or more non-transitory computer-readable media storing instructions thereon, wherein the instructions, when executed by one or more processors, cause the one or more processors to:
generate a list of software components in response to a request;
generate a plurality of ranking parameters;
determine a first plurality of weight values correlating with each of the plurality of ranking parameters;
generate an index correlating each of the plurality of software components with each of the plurality of ranking parameters;
parse web data to populate the index;
determine, via the ranking parameters, a plurality of scores for each of the plurality of software components;
store the scores on the index;
apply the first plurality of weight values to the plurality of scores on the index;
generate, for each of the software components, a combined score, wherein the combined score is a combination of each of the plurality of scores that are associated with each of the plurality of software components;
monitor one or more test software components;
periodically determine, via the plurality of ranking parameters, a plurality of test scores associated with the one or more test software components;
extract circumstantial web data regarding the plurality of test scores;
generate training data comprising interpreted correlations between the extracted circumstantial data and the plurality of test scores; and
train a machine learning model using the training data, wherein the trained machine learning model is configured to update the weight values.

16. The non-transitory computer-readable media of claim 15, wherein the circumstantial web data comprises data collected from news media, social media, and economic forecasts.

17. The non-transitory computer-readable media of claim 15, wherein parsing the web data comprises:
- scanning, by a data-crawler, public repositories, cloud providers, Q&A, review sites, vulnerability databases to retrieve information on popularity, releases, forks, quality, support, and security information regarding a software component; and
- storing, by the data-crawler, the information to the index, wherein the index is configured to operate as file storage.

\* \* \* \* \*